UNITED STATES PATENT OFFICE.

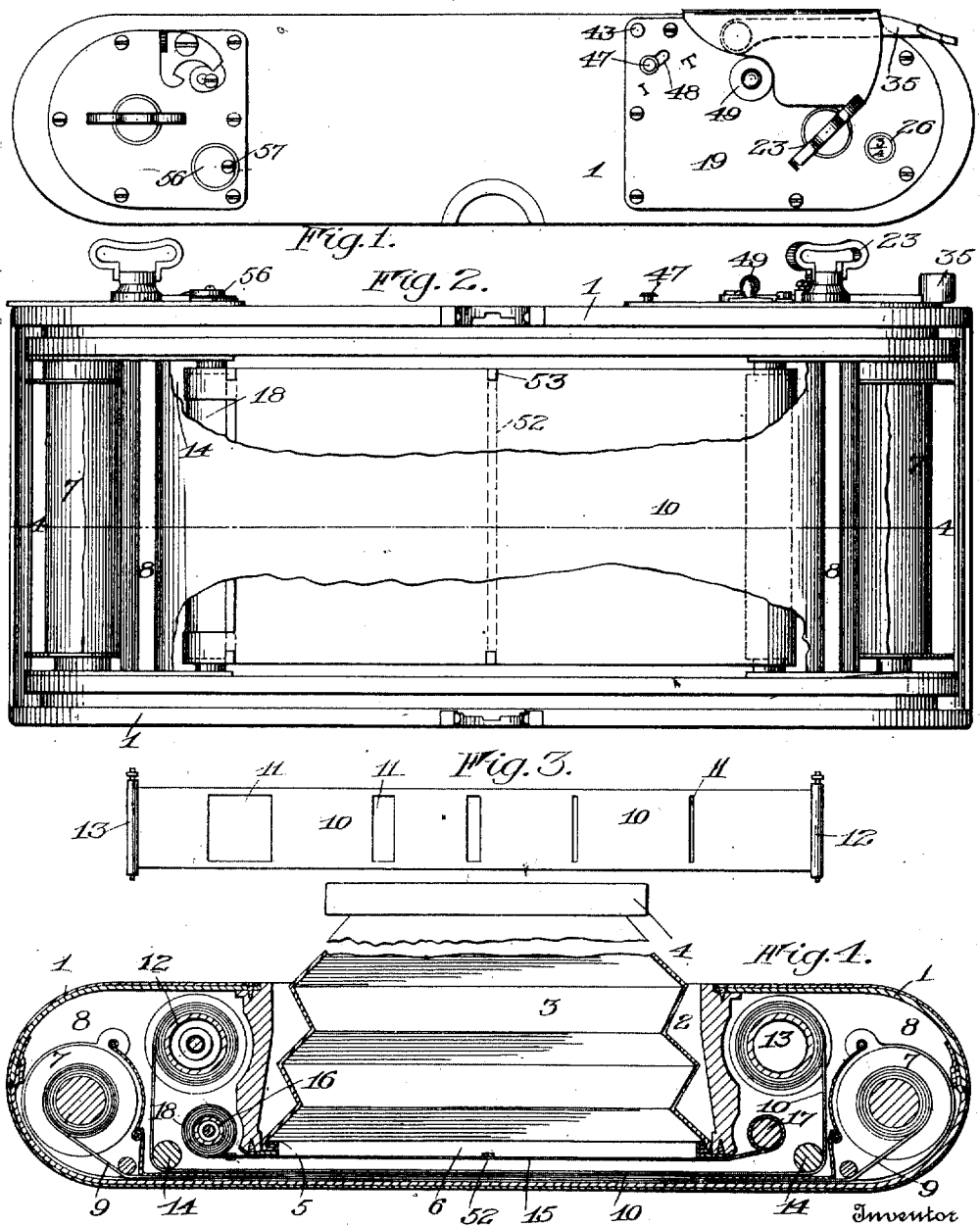

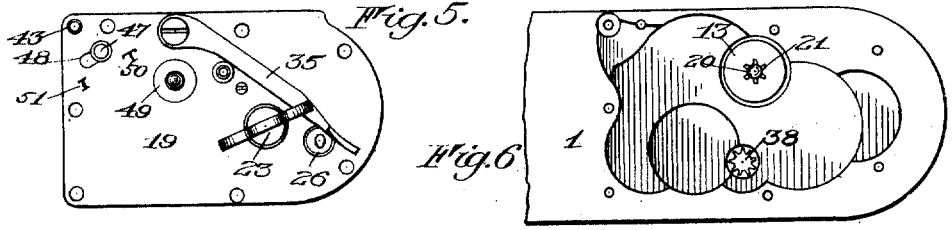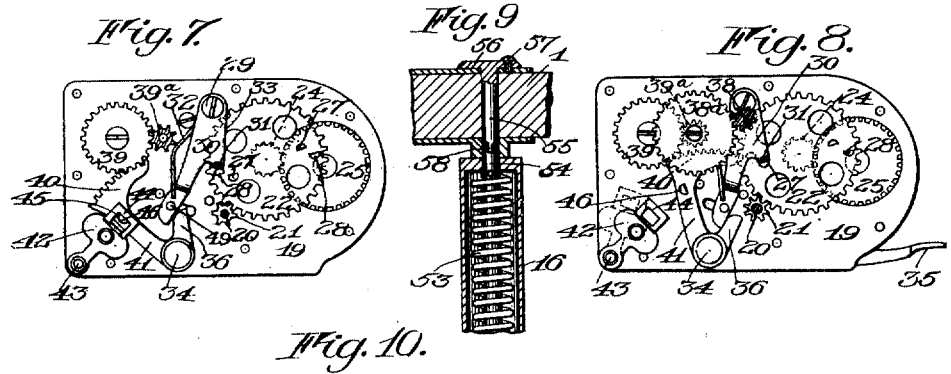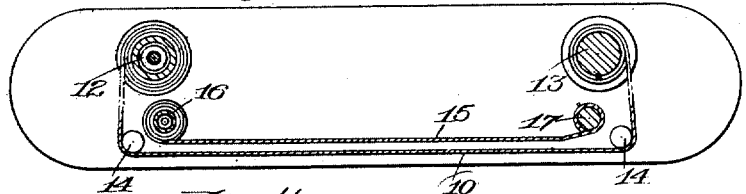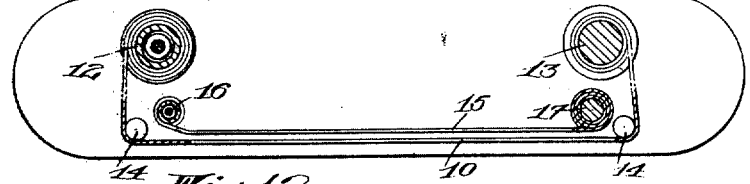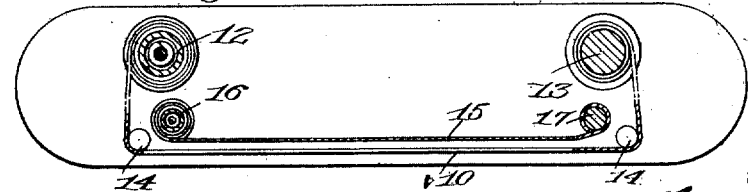

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

994,914. Specification of Letters Patent. Patented June 13, 1911.

Application filed October 6, 1909. Serial No. 521,254.

*To all whom it may concern:*

Be it known that I, WILLIAM F. FOLMER, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

The present invention relates to photography and more particularly to photographic cameras and related apparatus with which materials or objects are subjected to light exposure and has for its object to provide a simple, convenient and efficient shutter for use in connection therewith which will give any desired exposure either as to duration or volume.

My improvements are directed more particularly to shutters of the curtain type and they make provision for the absolute protection of the material or object from the leakage of light rays, particularly while the shutter is being set or while it is being changed from an adjustment for one kind of exposure to that of another.

The improvements are further directed to the means for effecting a time exposure.

To these and other ends the invention consists in certain improvements and combinations of parts all as will be hereinafter more fully described, the novel features being pointed out in the claims at the end of the specification.

In the drawings: Figure 1 is a top plan view of a photographic camera provided with a shutter constructed in accordance with and illustrating one embodiment of my invention; Fig. 2 is a rear elevation of the same with the back removed to reveal the shutter parts also in rear elevation; Fig. 3 is a plan view of the main shutter curtain fully extended; Fig. 4 is a horizontal section through the camera and shutter taken substantially on the line 4—4 of Fig. 2; Fig. 5 is a top plan view of the journal plate carrying the shutter controlling mechanism, the same being shown in Fig. 1 but with various parts in different positions; Fig. 6 is a top plan view of adjacent parts of the casing showing the manner in which it is formed to receive the journal plate and its mechanism, and also showing the positions of the curtain winding rollers; Fig. 7 is a bottom plan view of the journal plate and the shutter controlling mechanism carried thereby; Fig. 8 is a view similar to Fig. 7 but with the parts in different positions, and part of the gearing removed to reveal other parts; Fig. 9 is a longitudinal central section in detail and much enlarged through one of the tension rollers, showing the manner in which the tension of the driving spring is increased or diminished, and Figs. 10, 11 and 12 are diagrammatic views illustrating the mode of operation of the shutter for a time exposure.

Similar reference numerals throughout the views indicate the same parts.

In the present exemplary embodiment of the invention the shutter has been shown fitted to a folding camera of the familiar bellows type comprising the body or casing 1 having an intermediate exposure chamber 2 in which is stored the bellows 3 as well as the front 4 to which the latter is connected at one end, while the other end is secured at the rear of the exposure or bellows chamber as at 5, adjacent the exposure opening 6 in the rear of the camera. The film spools 7 are housed in the chambers 8 at the ends of the casing on opposite sides of the exposure chamber, the film 9 being fed from one to the other past the exposure opening 6.

In carrying out my present invention I provide a main shutter curtain 10 of the type illustrated individually in Fig. 3 and comprising a strip of flexible material having a series of spaced exposure apertures 11 therein ranging from a relatively small size for fast work to one corresponding approximately to the size of the exposure opening 6 for time work. This curtain of course operates in rear of the exposure opening and in front of the film 9 and is wound and re-wound between the tension roller 12 and the winding roller 13, each arranged in one of the film spool chambers 8, being guided over idlers 14. The camera casing thus serves in the present instance also as the shutter casing.

Touching briefly on the mode of operation of this type of shutter it is wound on the winding roller 13 from the tension roller 12 and against the power of the spring in the latter until the desired aperture for the next exposure has passed across the exposure opening 6 in the direction of the winding roller. The controlling mechanism is such that when the winding roller has been released the curtain is driven back onto the tension roller 12 by the motive power of the latter's spring to such extent that the said aperture is flashed across the exposure opening 6 to effect the exposure, the curtain being halted with the opaque portion thereof, which is between that aperture and the next succeeding one in a position that closes the exposure opening. The difficulty is that some means must be provided for shielding the film 9 during the first described setting movement and while, in being wound, the aperture first traverses the exposure opening and this has heretofore been done by capping the lens or in other ways.

By the present invention I provide preferably forwardly of the main curtain 10 a safety curtain 15 which travels between a tension roller 16 and a winding roller 17, both of which are also arranged in the film chamber 8. This curtain covers closely the exposure opening 6, passing preferably in intimate contact with adjacent portions of the casing, and is provided with a single aperture 18 of a size corresponding approximately to the maximum or time exposure aperture of the main curtain and to the exposure opening 6. This curtain is normally held by its tension roller in closed position but by means of the arrangements and devices hereinafter to be described it is opened automatically just at the instant that the exposing aperture of the main curtain starts its effective travel across the exposure opening.

The winding roller 13 of the main curtain is mounted at one end in a journal plate 19 secured preferably at the outer side of the casing 1, the shaft 20 thereof being provided with a fixed pinion 21 meshing with the winding gear 22 also mounted on the plate on a short shaft extending through the latter and having attached thereto a winding key 23 on the exterior of the camera (Figs. 1 and 5). The gear 22 also carries a spur 24 meshing with a toothed indicator wheel 25, the characters on which are viewable through a sight aperture 26 in the plate 19 and indicate that aperture of the curtain which, by reason of the degree of winding of the roller 13, is set to first pass across the exposure opening for an exposure.

Projecting from the under side of the gear 22 are winding stops 27 and arresting stops 28, one set of stops being arranged on the same circumference with each other but with a shorter radius than the other set. Pivoted on the plate at 29 adjacent the gear is a controlling lever 30 having a projection 31 thereon that is normally held in the path of the winding stop 27 by a spring 32 and which is displaced laterally within the path of the arresting pins 28 by the engagement of the winding stops with a surface 33 on the lever after which the projection 31 snaps back behind the winding stop as the winding roller 13 receives the curtain from the tension roller against the resistance thereof. The controlling lever 30 is manually displaced to effect an exposure by an operating lever 34 having an arm 35 accessible to the operator on the exterior of the plate 19 and a short arm 36 on the opposite or under face of the plate which engages the said lever 30. As the latter is moved thereby from the position of Fig. 8 to that of Fig. 7 (the operating arm 35 being then in the position of Fig. 5), the winding stop 27, which is at the time in engagement with the projection 31, is released for retrograde movement until the projection, moving into the path of the arresting stops 28, is engaged by that one of the latter which is next approaching, the same being so spaced as to thus halt the curtain as soon as the exposure aperture in the latter has passed the exposure opening in the camera. Furthermore, each winding stop 27 is so arranged with relation to one of the arresting stops 28 that subsequently, when manual pressure on the operating lever 34 is released and the controlling lever 30 is allowed to return under the influence of its spring 32, the projection 31 thereon will immediately engage behind the winding stop 27 before any appreciable lost motion of the curtain has occurred.

Returning now to the safety curtain 15, the roller 17 thereof is journaled in the casing to project therefrom toward the plate 19 and is provided with a fixed pinion 38 meshing with a gear 38ª, also carried on the plate and driving, through an attached pinion 39ª, a similarly mounted gear 39. Meshing with this gear 39 is a toothed segment 40 on a third arm 41 of the operating member 34. This train of gearing is so proportioned that when the member 34 is moved to carry the arm 41 from the position of Fig. 8 to that of Fig. 7 (in which the gear 38ª is removed), the safety curtain 15 will be completely wound on its winding roller 17 and the aperture 18 therein will be coincident with the exposure opening 6 of the camera, or in other words the safety curtain will be in open position. But simultaneously with this opening movement of the safety curtain, the controlling lever 30 of the main curtain is being displaced from its winding stop 27, and the proportions of the parts are such that the said winding movement of the curtain 15 is completed just at the instant the winding stop 27 is released so that the main curtain is actuated and will be at rest by the time the operator in relieving pressure on the arm 35 allows the motive force in the tension roller 16 of the safety curtain to close the latter as before.

The foregoing description has been chiefly confined to following the movements of the two curtains during what are termed instantaneous or automatically timed exposures. In the case of a time exposure, the two curtains being in the position shown by the diagram of Fig. 10, are set as before but the actuation of the main curtain is arranged, by previous setting, to bring simply the maximum or time exposure opposite the exposure opening at the time the safety curtain is fully opened, as shown in the diagram of Fig. 11. In the practice of my invention, this completely opened position of both shutter members, being the position of the parts in Fig. 7, is maintained for any desired length of time by means of a latch 42 pivoted to the plate 19 at 43 and having an abutment 44 thereon formed by an opening 45, which abutment snaps into engagement behind a coöperating abutment 46 on the arm 41, the said latch being of resilient material allowing it to yield outwardly from the plate 19 to effect this result. When it is wished to terminate the exposure, an operating portion 47 on the latch extending through a slot 48 to the exterior side of the plate 19, is depressed which releases the abutments 44 and 46 from coöperation and allows the parts to resume the position of Fig. 8, the safety curtain being closed as shown in Fig. 12. The main curtain may then be subsequently closed, if desired (although this is not altogether necessary) by actuating it independently of the safety curtain by means of an operating portion 49 on the controlling lever 30, whereat the said lever moves away from instead of with the arm 36 of the operating lever 34 common to both curtains.

The latch 42 must, of course, be rendered inoperative when it is desired to use the shutter for instantaneous work, in which case it is moved on its pivot parallel with the plate 19 to the dotted line position of Fig. 8, wherein its abutment 44 is out of the path of the abutment 46 during the movement of the arm 41. This movement of the latch to inoperative position is effected by the manipulation of the operating portion 47 thereon and the said portion coöperates with an index character 50 adjacently arranged on the plate 19 when the latch is in operative position to indicate a time exposure setting of the shutter as a whole and with an index character 51 when in its inoperative position for instantaneous work.

One of the advantages of a shutter constructed in accordance with my invention is that the rapidly moving main curtain can be spaced from the exposure opening of the camera and hence is not subject to the wear incident to contact therewith. The safety curtain is in close contact with the frame or casing adjacent to the exposure opening in the position of the ordinary single shutter curtain so that the light is effectively cut off at all times and as the safety curtain moves at a comparatively slow speed the wear thereon is negligible. There is one objection however, to this close contact of the curtain with the exposure opening, and that is that in a bellows camera, the rarefaction of the air in the exposure chamber when the bellows is extended causes the curtain to bulge or sag inwardly often causing it to foul on the casing or on the rollers and ultimately destroying its initial flatness. To obviate this I provide the opaque portion of the safety curtain, which is normally spanning the exposure opening, with a supporting rib 52 of relatively stiff material which extends transversely across the material of the curtain parallel with the rollers so that no difficulty will be had in winding it thereon and which bears upon the casing at its ends adjacent the exposure opening, the said strip being fastened in place in the present instance by clenching its ends over the marginal edges of the curtain.

In order to provide means for varying the tension of the spring 53 in the tension roller 16 of the safety curtain, notably to increase the tension thereof in case it sticks or does not work with sufficient freedom, I provide the shaft 54 thereof with an extension 55 that extends through a wall of the casing 1 and terminates in a preferably circular cap piece 56 having a bearing against the casing and held in position thereon by a suitable removable and replaceable securing member 57, the said extension 55 being preferably made separate from but capable of interlocking with the remaining portions for convenience in assembling, as at 58. The spring 53, being attached at one end to the roller drum 16 and to the shaft at the other, the extension can be increased or diminished by rotating the cap 56 one or more revolutions after removing the securing device 57 and then replacing the latter.

I claim as my invention:

1. In a photographic shutter, the combination with a spring actuated main curtain and a safety curtain, the latter being normally in closed position, of means for winding the main curtain independently of the safety curtain to reset the same, and means for releasing the main curtain and automatically opening the safety curtain.

2. In a photographic shutter, the combination with a spring actuated main curtain and a safety curtain, the latter being normally in closed position, of means for winding the main curtain to set position independently of the safety curtain, a detent for holding it in such set position, and a member for operating the safety curtain to open position operatively connected with the detent to release the latter when the safety curtain is fully opened.

3. In a photographic shutter, the combination with a main curtain, a safety curtain and independent tension and winding rollers for each respectively, the tension roller of the safety curtain normally holding the latter in closed position, of winding mechanism for the main curtain embodying a detent for holding it in set position, a toothed member movable with the winding roller of the safety curtain and a toothed operating member meshing with the first mentioned toothed member to wind the safety curtain to open position and operatively connected with the detent to trip the main curtain as the safety curtain completes its opening movement.

4. In a photographic shutter, the combination with a main curtain and a safety curtain having a driving roller normally maintaining it in closed position, of means for setting the main curtain independently of the safety curtain, an operating member for opening the safety curtain connected to release the main curtain by a continued movement of the member, and a latch coöperating automatically with the operating member to hold the safety curtain open.

5. In a photographic shutter, the combination with a shutter member a part movable therewith when the shutter member is operated to set position and having an abutment thereon and a spring acting on said part to resist such movement, of a latch for holding the shutter in set position by automatic engagement with the abutment on the movable part comprising a yielding pivoted plate having an abutment thereon adapted to ride over the other abutment and automatically lock therewith, said plate being movable on its pivot to bring its abutment into and out of the path of the abutment on the movable member and adapted to yield transversely of the plane of its pivotal movement to release the coöperating abutments from engagement.

6. In a photographic shutter, the combination with a main curtain and a safety curtain having a driving roller normally maintaining it in closed position, of means for setting the main curtain independently of the safety curtain, an operating member for opening the safety curtain connected to release the main curtain by a continued movement of the member, a latch coöperating automatically with the operating member to hold the safety curtain closed and means for successively releasing the main curtain independently of the safety curtain.

7. In a photographic shutter, the combination with a main curtain and a safety curtain having a driving means normally maintaining it in closed position, of means for setting the main curtain independently of the safety curtain, means for actuating it in successive stages by intermittent movements in the same direction, an operating member movable in one direction to open the safety curtain said member being connected to release by a continued movement the main curtain for one stage of the latter's movement, a latch for holding the safety curtain open and independent means for releasing the main curtain for another stage of its movement.

8. The combination with a camera casing having a bellows chamber provided with a rearward exposure opening, a front and bellows connected to the front and communicating with the chamber, of a curtain shutter composed of a strip of flexible opaque material operating in rear of the exposure opening and a supporting rib, of relatively stiff material extending across the material of the curtain and arranged to bear upon the casing adjacent to the exposure aperture when the shutter is closed to prevent the latter from sagging inwardly when the air in the bellows chamber is rarefied by the extension of the bellows.

9. The combination with a camera casing having a bellows chamber provided with a rearward exposure opening, a front, bellows connected to the front and communicating with the chamber and curtain rollers carried by the casing, of a curtain shutter composed of a strip of flexible opaque material wound on the rollers and operating in rear of the exposure opening and a supporting rib of relatively stiff material extending transversely across and carried by the material of the curtain and arranged parallel with the rollers to bear upon the casing adjacent to the exposure aperture when the shutter is closed to prevent the latter from sagging inwardly when the air in the bellows chamber is rarefied by the extension of the bellows.

10. In a photographic shutter, the combination with a casing, a shutter curtain and a tension or driving roller therefor comprising a shaft journaled in the casing, a barrel on the shaft and a spring connected to the shaft and barrel, respectively, of means for varying the tension of the spring comprising a cap on the end of the shaft bearing against the outer side of the casing and a removable and replaceable fastening member connecting the cap and casing.

WILLIAM F. FOLMER.

Witnesses:
RUSSELL B. GRIFFITH,
LUCY A. VAN COURT.

---

Copies of this patent may be obtained for five cents each, by addressing the "Commissioner of Patents, Washington, D. C."